(12) United States Patent
Thomsen et al.

(10) Patent No.: US 6,783,253 B2
(45) Date of Patent: Aug. 31, 2004

(54) FIRST SURFACE MIRROR WITH DLC COATING

(75) Inventors: Scott V. Thomsen, Milford, MI (US); Michael Andreasen, Rochester Hills, MI (US)

(73) Assignee: Guardian Industries Corp., Auburn Hills, MI (US)

(*) Notice: Subject to any disclaimer, the term of this patent is extended or adjusted under 35 U.S.C. 154(b) by 0 days.

(21) Appl. No.: 10/105,805

(22) Filed: Mar. 21, 2002

(65) Prior Publication Data

US 2003/0179454 A1 Sep. 25, 2003

(51) Int. Cl.$^7$ ................................................. G02B 5/08
(52) U.S. Cl. .......................... 359/870; 359/838; 359/884
(58) Field of Search ................................. 359/585, 884, 359/582, 870, 838

(56) References Cited

U.S. PATENT DOCUMENTS

| | | |
|---|---|---|
| 4,101,707 A | 7/1978 | Henry |
| 4,255,214 A | 3/1981 | Workens |
| 4,272,588 A | 6/1981 | Yoldas et al. |
| 4,309,075 A | 1/1982 | Apfel et al. |
| 4,512,635 A | 4/1985 | Melde |
| 4,728,529 A | 3/1988 | Etzkorn et al. |
| 4,780,372 A | 10/1988 | Tracy et al. |
| 5,105,310 A | 4/1992 | Dickey |
| 5,135,808 A | 8/1992 | Kimock et al. |
| 5,372,874 A | 12/1994 | Dickey et al. |
| 5,378,527 A | 1/1995 | Nakanishi et al. |
| 5,425,983 A | 6/1995 | Propst et al. |
| 5,470,661 A | 11/1995 | Bailey et al. |
| 5,669,681 A | 9/1997 | Ishikawa et al. |
| 5,846,649 A | 12/1998 | Knapp et al. |
| 5,854,708 A | 12/1998 | Komatsu et al. |
| 5,858,477 A | 1/1999 | Veerasamy et al. |
| 5,888,593 A | 3/1999 | Petrmichl et al. |
| 5,896,236 A | 4/1999 | Lostumo et al. |
| 5,900,342 A | 5/1999 | Visser et al. |
| 5,923,464 A | 7/1999 | Braun |
| 5,930,046 A | 7/1999 | Solberg et al. |
| 5,976,683 A | 11/1999 | Liehrr et al. |
| 6,002,208 A | 12/1999 | Maishev et al. |
| 6,068,379 A | 5/2000 | Kempf |
| 6,101,031 A * | 8/2000 | Yoshimura et al. ......... 359/456 |
| 6,261,693 B1 | 7/2001 | Veerasamy |
| 6,275,272 B1 | 8/2001 | Park |
| 6,303,225 B1 | 10/2001 | Veerasamy |
| 6,312,808 B1 | 11/2001 | Veerasamy et al. |
| 6,338,901 B1 | 1/2002 | Veerasamy |
| 6,544,716 B1 * | 4/2003 | Hajjar et al. ............. 430/271.1 |

FOREIGN PATENT DOCUMENTS

| | | |
|---|---|---|
| DE | 198 38 826 | 3/2000 |
| EP | 0 456 488 | 11/1991 |
| EP | 0 573 163 | 12/1993 |
| GB | 2 224 366 | 5/1990 |

OTHER PUBLICATIONS

Properties of Ion Beam Deposited Tetrahedral Fluorinated Amorphous Carbon Films (ta–C:F), Ronning et al., Mat. Res. Soc. Symp. Proc. vol. 593, 2000, pp. 335–340.

\* cited by examiner

*Primary Examiner*—Drew A. Dunn
*Assistant Examiner*—Joshua L Pritchett
(74) *Attorney, Agent, or Firm*—Nixon & Vanderhye P.C.

(57) ABSTRACT

A first surface mirror includes a reflective layer (e.g., Al or Ag), at least one dielectric layer and at least one protective layer of or including high density diamond-like carbon (DLC). The high density DLC enables the protective layer to be applied at a relatively small thickness which enables undesirable color often associated with DLC to be prevented or minimized, while at the same time good protective characteristics (e.g., scratch resistance) can be realized.

30 Claims, 2 Drawing Sheets

FIRST SURFACE MIRROR WITH DLC COATING

This application is related to a mirror including a coating thereon that comprises diamond-like carbon (DLC). More particularly, certain example embodiments of this invention are related to such a mirror used in the context of a projection television (PTV) apparatus, or any other suitable application.

BACKGROUND OF THE INVENTION

Mirrors for various uses are known in the art. For example, see U.S. Pat. Nos. 5,923,464, 4,309,075, and 4,272,588 (all hereby incorporated herein by reference). Mirrors are also known for use in projection televisions and other suitable applications. In the projection television context, see for example U.S. Pat. Nos. 6,275,272, 5,669,681 and 5,896,236 (all hereby incorporated herein by reference).

One type of mirror is a second or back surface mirror (most common), while another type of mirror is a first or front surface mirror (less common). Back surface mirrors typically include a glass substrate with a reflective coating on a back surface thereof (i.e., not on the front surface which is first hit by incoming light). Incoming light passes through the glass substrate before being reflected by the coating. Thus, reflected light passes through the glass substrate twice in back surface mirrors; once before being reflected and again after being reflected on its way to a viewer. In certain instances, passing through the glass substrate twice can create ambiguity in directional reflection and imperfect reflections may sometimes result. Mirrors such as bathroom mirrors, bedroom mirrors, and architectural mirrors are typically back surface mirrors so that the glass substrate can be used to protect the reflective coating provided on the rear surface thereof.

In applications where more accurate reflections are desired, front surface mirrors are often used. In front surface mirrors, a reflective coating is provided on the front surface of the glass substrate so that incoming light is reflected by the coating before it passes through the glass substrate. Since the light to be reflected does not have to pass through the glass substrate in first surface mirrors (in contrast to rear surface mirrors), first surface mirrors generally have higher reflectance than rear surface mirrors and no double reflected image. Example front surface mirrors (or first surface mirrors) are disclosed in U.S. Pat. Nos. 5,923,464 and 4,780,372 (both incorporated herein by reference).

Many first surface mirror reflective coatings include a dielectric layer(s) provided on the glass substrate over a reflective layer (e.g., Al or Ag). Unfortunately, when the overcoat dielectric layer becomes scratched or damaged in a front surface mirror, this affects reflectivity in an undesirable manner as light must pass through the scratched or damaged layer(s) twice before reaching the viewer (this is not the case in back/rear surface mirrors where the reflective layer is protected by the glass). Dielectric layers typically used in this regard are not very durable, and are easily scratched or otherwise damaged leading to reflectivity problems. Thus, it can be seen that front/first surface mirrors are very sensitive to scratching or other damage of the dielectric layer(s) which overlie the reflective layer.

U.S. Pat. No. 6,068,379 discloses a dental mirror with a protective diamond-like carbon (DLC) layer thereon. Unfortunately, the type of DLC used in the '379 Patent is undesirable in that it (a) requires heating up to 2000 degrees F. for its application which tends to damage many types of undercoat layers, and (b) is not very dense which translates into the need for a very thick coating which tends to create an undesirable yellow-brown color that is clearly undesirable and can adversely affect reflective properties. This type of DLC also tends to delaminate rather easily. Thus, both the method for applying this type of DLC, and the type of DLC itself are undesirable. Moreover, the '379 Patent illustrates a rear surface mirror which does not have the problems associated with front surface mirrors discussed above.

It will be apparent from the above that there exists a need in the art for a first/front surface mirror that is less susceptible to scratching or other damage of dielectric layer(s) overlying the reflective layer. It will also be apparent that there exists a need in the art for a protective coating that can be applied at reasonably low temperatures, and/or which does not introduce significant yellow and/or brown color to the mirror (some small amount of yellow and/or brown color is permissible, but large amounts are undesirable).

BRIEF SUMMARY OF THE INVENTION

An object of this invention is to provide a mirror including a diamond-like carbon (DLC) coating thereon. The mirror may be used in projection televisions, copiers, scanners, bar code readers, overhead projectors, and/or any other suitable applications.

Another object of this invention is to provide a protective layer(s) comprising DLC over a reflective coating of a first surface mirror, wherein the DLC has a high density so that it can be applied at a rather small thickness so that it does not introduce significant discoloration to the mirror.

Another object of this invention is to provide a protective layer(s) comprising DLC over a reflective layer(s) of a first surface mirror, wherein the DLC can be applied at rather low temperatures so that underlying layer(s) are not significantly damaged during the application of the DLC.

Another object of this invention is to provide a first surface mirror with a protective layer including DLC, wherein the index of refraction value "n" and/or thickness of the DLC is/are adjusted based upon indices of other layers of the mirror in order to achieve good reflective and/or optical properties of the mirror.

Another object of this invention is to fulfill one or more of the above-listed needs and/or objects.

In certain example embodiments of this invention, one or more of the above listed objects and/or needs is/are fulfilled by providing a first surface mirror comprising: a glass substrate supporting a coating, wherein the coating includes at least a reflective layer, first and second dielectric layers, and a layer comprising amorphous diamond-like carbon (DLC), wherein the reflective layer is provided between the glass substrate and the dielectric layers, and the layer comprising DLC is provided over the reflective layer and the dielectric layers, wherein the first dielectric layer has an index of refraction value "n" greater than an index of refraction value "n" of the reflective layer and less than an index of refraction value "n" of the second dielectric layer, and the layer comprising DLC has an index of refraction value "n" less than the index of refraction value "n" of the second dielectric layer, and wherein the layer comprising DLC has an average density of at least about 2.4 gm/cm$^3$ and at least about 40% of carbon-carbon bonds in the layer comprising DLC are sp$^3$ type carbon-carbon bonds, and wherein the layer comprising DLC has an average hardness of at least about 10 GPa.

In other example embodiments of this invention, one or more of the above listed objects and/or needs may be fulfilled by providing a mirror comprising: a substrate supporting a coating, wherein the coating includes a reflective layer, at least a first dielectric layer, and a layer comprising diamond-like carbon (DLC) provided over the reflective layer and the first dielectric layer, and wherein the layer comprising DLC has an average density of at least about 2.4 gm/cm$^3$ and at least about 40% of carbon-carbon bonds in the layer comprising DLC are sp$^3$ type carbon-carbon bonds, and wherein the layer comprising DLC is from about 1–100 nm thick.

In still other example embodiments of this invention, one or more of the above listed objects and/or needs may be fulfilled by providing a projection television including a first surface mirror for reflecting at least red, blue and green light components from a source toward a lens so that an image can be viewed by a viewer, wherein the first surface mirror comprises: a glass substrate supporting a coating, wherein the coating includes a reflective layer, at least one dielectric layer, and a layer comprising amorphous diamond-like carbon (DLC), wherein the reflective layer is provided between the glass substrate and the dielectric layer, and the layer comprising DLC is provided over the reflective layer and the dielectric layer, and wherein the layer comprising DLC has an average density of at least about 2.4 gm/cm$^3$, an average hardness of at least about 10 GPa, and a thickness of from 1–100 nm.

DETAILED DESCRIPTION OF THE INVENTION

The instant invention relates to a mirror that may be used in the context of projection televisions (PTVs), copiers, scanners, bar code readers, overhead projectors, and/or any other suitable applications. In certain embodiments, the mirror is a first surface mirror that includes a multi-layer coating thereon. The multi-layer coating preferably includes at least one reflective layer (e.g., Al, Ag, and/or the like) that may be covered by at least one dielectric layer(s) and a layer comprising diamond-like carbon (DLC). The DLC is of a type having a high density (i.e., density of at least 2.4 gm/cm$^3$, even more preferably of at least 2.7 gm/cm$^3$) so that it can be applied at a rather small thickness so that it does not introduce significant discoloration to the mirror. The DLC may also be of a type so that it can be applied using rather low temperatures of the substrate to which it is applied (e.g., temperatures lower than about 350 degrees C., more preferably lower than about 200 degrees C., and most preferably lower than about 100 degrees C.) so that the underlying layer(s) are not significantly damaged during deposition of the DLC. In certain instances, the DLC may be applied/deposited via ion beam deposition. In certain example embodiments of this invention, the DLC inclusive layer(s) can be ion beam deposited in a manner so as to be at least partially subimplanted into a dielectric layer between the DLC and the reflective layer in order to improve adhesion characteristics, and thus durability of the mirror.

Figure 1:
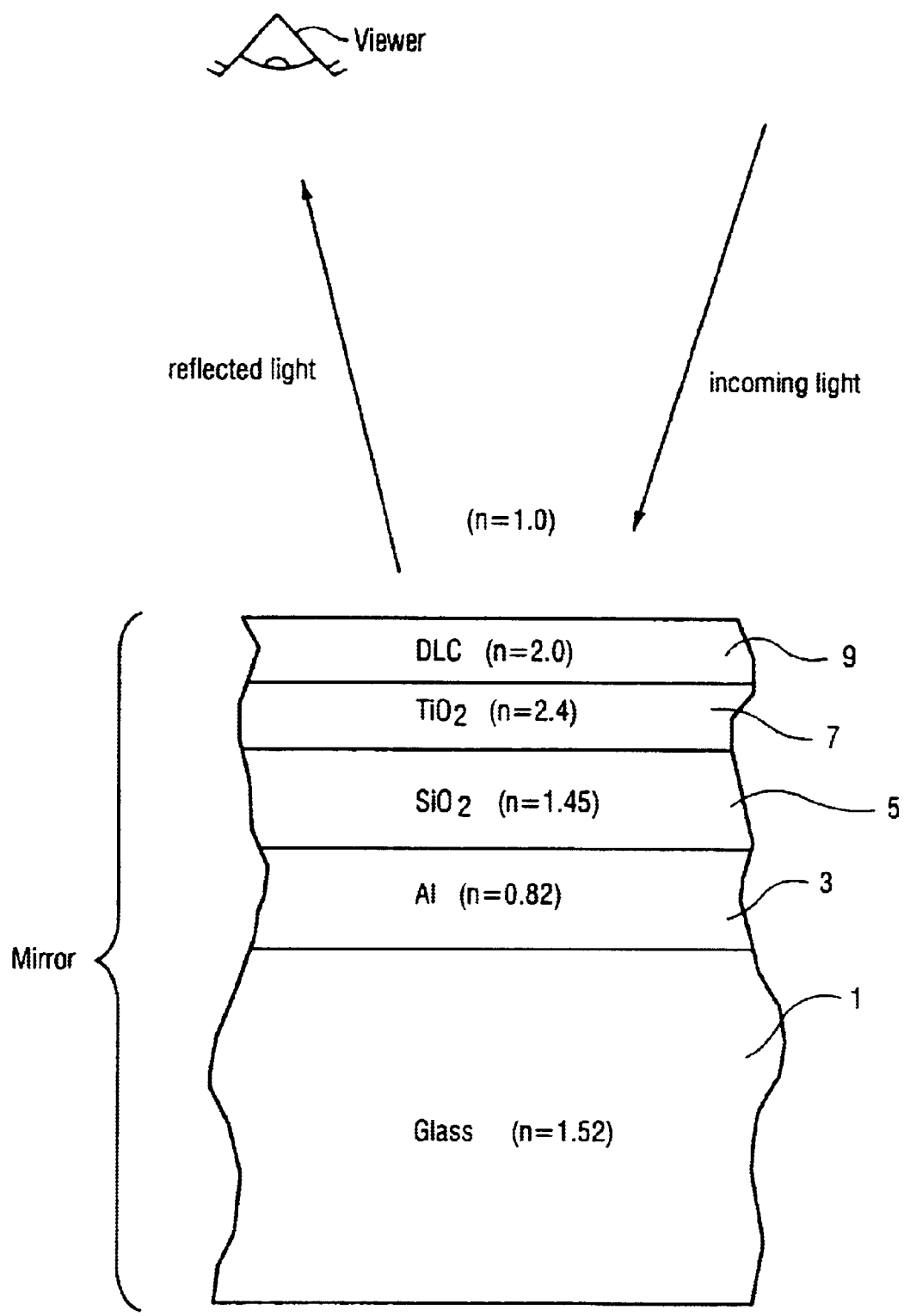
FIG. 1 is a cross sectional view of a first surface mirror according to an example embodiment of this invention.

FIG. 1 is a cross sectional view of a first surface mirror according to an example embodiment of this invention. The mirror includes glass substrate 1 that supports a multi-layer coating including reflective layer 3, first dielectric layer 5, second dielectric layer 7, and at least one protective layer(s) 9 that is of or includes DLC. Substrate 1 may be plastic or even metal in certain instances. The reflective layer 3 provides the main reflection, while dielectric layers 5, 7 and DLC inclusive layer 9 work together to enhance the reflection and tune the spectral profile to the desired wavelength region. Optionally, another dielectric layer(s) (not shown) such as tin oxide and/or silicon oxide may be provided on the substrate under the reflective layer 3 so as to be located between substrate 1 and reflective layer 3 in order to promote adhesion of the reflective layer 3 to the substrate. According to other alternative embodiments, additional dielectric layer(s) (not shown) may be provided over the reflective layer 3 so as to be provided between layer 3 and dielectric layer 5.

In other embodiments of this invention for example, another silicon oxide layer (e.g., SiO$_2$) and another titanium oxide layer (e.g., TiO$_2$) may be stacked on top of layers 3–7 in this order in certain embodiments of this invention so that four dielectric layers are provided instead of the two shown in FIG. 1. In still other embodiments of this invention, the layers 3–7 of FIG. 1 may be replaced with the following layers from the glass substrate 1 outwardly: glass/NiCrN$_x$/Ag/NiCrN$_x$/SiN$_x$/SiO$_2$/TiO$_2$/DLC. In such embodiments, the layers (e.g., silicon oxide, silicon nitride, titanium oxide, etc.) may or may not be stoichiometric in different embodiments of this invention. In still further embodiments of this invention, layer 7 and/or layer 5 in FIG. 1 may be eliminated.

Those skilled in the art will appreciate that the term "between" as used herein does not mean that a layer between two other layers has to contact the other two layers (i.e., layer A can be "between" layers B and C even if it does not contact layer(s) B and/or C, as other layer(s) can also be provided between layers B and C).

Glass substrate 1 may be from about 1–10 mm thick in different embodiments of this invention, and may be any suitable color (e.g., grey, clear, green, blue, etc.). In certain example instances, glass (e.g., soda lime silica type glass) substrate 1 is from about 1–5 mm thick, most preferably about 3 mm thick. When substrate 1 is glass, it has an index of refraction value "n" of from about 1.48 to 1.53 (most preferably about 1.51) (all indices "n" herein are at 550 nm).

Reflective layer 3 may be of or include Al, Ag or any other suitable reflective material in certain embodiments of this invention. Reflective layer 3 reflects the majority of incoming light before it reaches glass substrate 1 and directs it toward a viewer away from the glass substrate, so that the mirror is referred to as a first surface mirror. In certain embodiments, reflective layer 3 has an index of refraction value "n" of from about 0.05 to 1.5, more preferably from about 0.05 to 1.0. When layer 3 is of Al, the index of refraction "n" of the layer 3 may be about 0.8, but it also may be as low as about 0.1 when the layer 3 is of Ag. In certain example embodiments of this invention, a metallic layer 3 of Al may be sputtered onto the substrate 1 using a C-MAG rotatable cathode Al inclusive target (may or may not be doped) and/or a substantially pure Al target (>=99.5% Al) (e.g., using 2 C-MAG targets, Ar gas flow, 6 kW per C-MAG power, and pressure of 3 mTorr), although other methods of deposition for layer 3 may be used in different instances. In sputtering embodiments, the target(s) used for sputtering Al layer 3 may include other materials in certain instances (e.g., from 0–5% Si to help the Al bond to substrate 1 and/or layer 5). Reflective layer 3 in certain embodiments of this invention has a reflectance of at least 75% in the 500 nm region as measured on a Perkin Elmer Lambda 900 or equivalent spectrophotometer, more preferably at least 80%, and even more preferably at least 85%, and in some instances at least 90%. Moreover, in certain embodiments of this invention, reflective layer 3 is not completely opaque, as it may have a small transmission in the aforesaid wavelength region of from 0.1 to 5%, more preferably from about 0.5 to 1.5%. Reflective layer 3 may be from about 20–150 nm thick in certain embodiments of this invention, more preferably from about 40–90 nm thick, even more preferably from about 50–80 nm thick, with an example thickness being about 65 nm when Al is used for layer 3.

First dielectric layer 5 may be of or include silicon oxide (e.g., approximately stoichiometric $SiO_2$ or any suitable non-stoichiometric oxide of silicon) in certain embodiments of this invention. Such silicon oxide may be sputtered onto the substrate 1 over layer 3 using Si targets (e.g., using 6 Si C-MAG targets, 3 mTorr pressure, power of 12 kW per C-MAG, and gas distribution of about 70% oxygen and 30% argon). In certain embodiments, first dielectric layer 5 has an index of refraction value "n" higher than that of layer 3, and preferably from 1.2 to 2.2, more preferably from 1.3 to 1.9, even more preferably from 1.4 to 1.75. For example, silicon oxide having an index of refraction of about 1.45 can be used for first dielectric layer 5 in certain example embodiments of this invention. First dielectric layer 5 may be from about 10–200 nm thick in certain embodiments of this invention, more preferably from about 50–150 nm thick, even more preferably from about 70–110 nm thick, with an example thickness being about 90 nm when the layer is of silicon oxide.

Second dielectric layer 7 may be of or include titanium oxide (e.g., approximately stoichiometric $TiO_2$, or any suitable non-stoichiometric type of titanium oxide) in certain embodiments of this invention. Such titanium oxide may be sputter coated onto the substrate over layers 3 and 5 using Ti targets (e.g., 6 Ti C-MAG targets, pressure of 3.0 mTorr, power of 42 kW per C-MAG target, and a gas flow of about 60% oxygen and 40% argon). In certain embodiments, second dielectric layer 7 has an index of refraction "n" higher than that of layers 3 and/or 5, and preferably from 2.0 to 3.0, more preferably from 2.2 to 2.7, even more preferably from 2.3 to 2.5. For example, titanium oxide having an index of refraction value "n" of about 2.4 can be used for second dielectric layer 7 in certain example embodiments of this invention. Other suitable dielectrics may also be used in the aforesaid index of refraction range. Second dielectric layer 7 may be from about 10–150 nm thick in certain embodiments of this invention, more preferably from about 20–80 nm thick, even more preferably from about 20–60 nm thick, with an example thickness being about 40 nm when the layer is titanium oxide. As will be appreciated by those skilled in the art, both layers 5 and 7 (and layer 9) are substantially transparent to visible light so as to enable light to reach reflective layer 3 before being reflected thereby; and each of layers 3–7 may be sputter coated onto the substrate in certain example embodiments of this invention.

Protective layer(s) 9 of or including DLC may be from about 1–100 nm thick in certain embodiments of this invention, more preferably from about 1–25 nm thick, even more preferably from about 1–10 nm thick, and most preferably from about 1–5 nm thick, with an example thickness of DLC inclusive layer 9 being about 2 nm. DLC inclusive layer 9 may be ion beam deposited in a manner so as to have an index of refraction value "n" of from about 1.6 to 2.2, more preferably from 1.9 to 2.1, and most preferably from about 1.95 to 2.05 so as to function as both a protective layer and an antireflective layer in certain example embodiments of this invention. In certain embodiments of this invention, layer 9 may be of or include a special type of DLC such as highly tetrahedral amorphous carbon (ta-C). Moreover, in this regard, the DLC of layer 9 may be ion beam deposited in a manner using a high ion energy (e.g., 500 to 3,000 eV per C atom) and using appropriate gas flow (e.g., a hydrocarbon gas such as acetylene) so that the resulting DLC inclusive layer 9 can be deposited at low temperatures and has a high average density of at least about 2.4 $gm/cm^3$, more preferably of at least about 2.7 $gm/cm^3$ (e.g., average density of from 2.6 to 3.1 $gm/cm^3$ in certain instances). Additionally, the ion beam deposition technique used enables the DLC (e.g., ta-C) to be characterized in that at least 40% of the carbon-carbon (C—C) bonds therein are of the $sp^3$ type, more preferably at least 50% are of the $sp^3$ type, even more preferably at least 60% are of the $sp^3$ type (as opposed to the $sp^2$ type). Thus, in certain embodiments of this invention, the DLC of layer 9 has more $sp^3$ type carbon-carbon bonds than the more graphitic $sp^2$ type carbon-carbon bonds. Protective layer 9 in certain example embodiments has an average hardness of at least about 10 GPa, more preferably of at least about 20 GPa, and most preferably of at least 30 GPa in certain embodiments of this invention.

The DLC inclusive layer 9, in certain example embodiments of this invention, may be any of the DLC inclusive layers described in any of U.S. Pat. Nos. 6,261,693, 6,303,225, 6,338,901, or 6,312,808, all of which are hereby incorporated herein by reference. The DLC inclusive layer (s) 9 may be ion beam deposited as described in any of U.S. Pat. Nos. 6,261,693, 6,303,225, 6,338,901, or 6,312,808 (all incorporated herein by reference). In certain example instances, the DLC may be deposited using an ion beam source with acetylene gas at about 1500–3000 V potential, at a pressure such as 1 mTorr.

The use of such a high density DLC inclusive layer(s) 9, and the ion beam deposition techniques described above, enables layer(s) 9 to be ion beam deposited onto substrate 1 over layers 3–7 in a very dense manner and so that at least some C atoms and/or C—C bonds of the layer 9 are subimplanted into second dielectric layer 7. Moreover, the high density of layer 9 enables the layer to be applied in the small thickness range discussed above that is still scratch resistant, which small thickness of layer 9 enables reduction and/or prevention of the occurrence of undesirable brown/yellow color so often associated with DLC coatings. As a result of the high density and subimplantation, layer 9 is very securely adhered to layer 7 and provides good scratch resistance properties, and also can be used in thicknesses that do not significantly affect the optical properties of the first surface mirror. The high density of DLC inclusive layer 9 enables a rather thin layer of the same to provide good protective properties (e.g., scratch resistance). Moreover, the ion beam deposition process can be adjusted to achieve an index of refraction "n" for layer 9 that can be used for antireflection purposes.

In certain embodiments of this invention, layer 9 may be of the ta-C type of DLC. However, in other embodiments of this invention, the DLC inclusive layer 9 may include other elements. For example, in certain embodiments, the ta-C may be hydrogenated (ta-C:H) so as to include from about 0.5 to 20% H, more preferably from about 0.5 to 10% H, and even more preferably from about 0.5 to 5% H. Other dopants such as B, Si and/or the like may also be used in certain embodiments of this invention. Optionally, more than one layer 9 of DLC may be used, and in still further embodiments of this invention other layer(s) may be provided over DLC inclusive layer 9. It is noted that the materials discussed above are provided for purposes of example, and without limitation unless expressly recited in the claims herein.

By arranging the respective indices of refraction "n" of layers 3–9 as discussed above, it is possible to achieve both a scratch resistant and thus durable first surface mirror where it is difficult to scratch protective layer 9, and good anti-reflection properties from layers 5–9 which enable the mirror's optical performance to be improved. The provision of a DLC inclusive protective layer 9 that is durable and scratch resistant, and has a good index of refraction, enables the combination of good durability and good optical performance to be achieved. The first surface mirror may have a visible reflection of at least about 80%, more preferably of at least about 85%, and even at least about 95% in certain embodiments of this invention.

Figure 2:
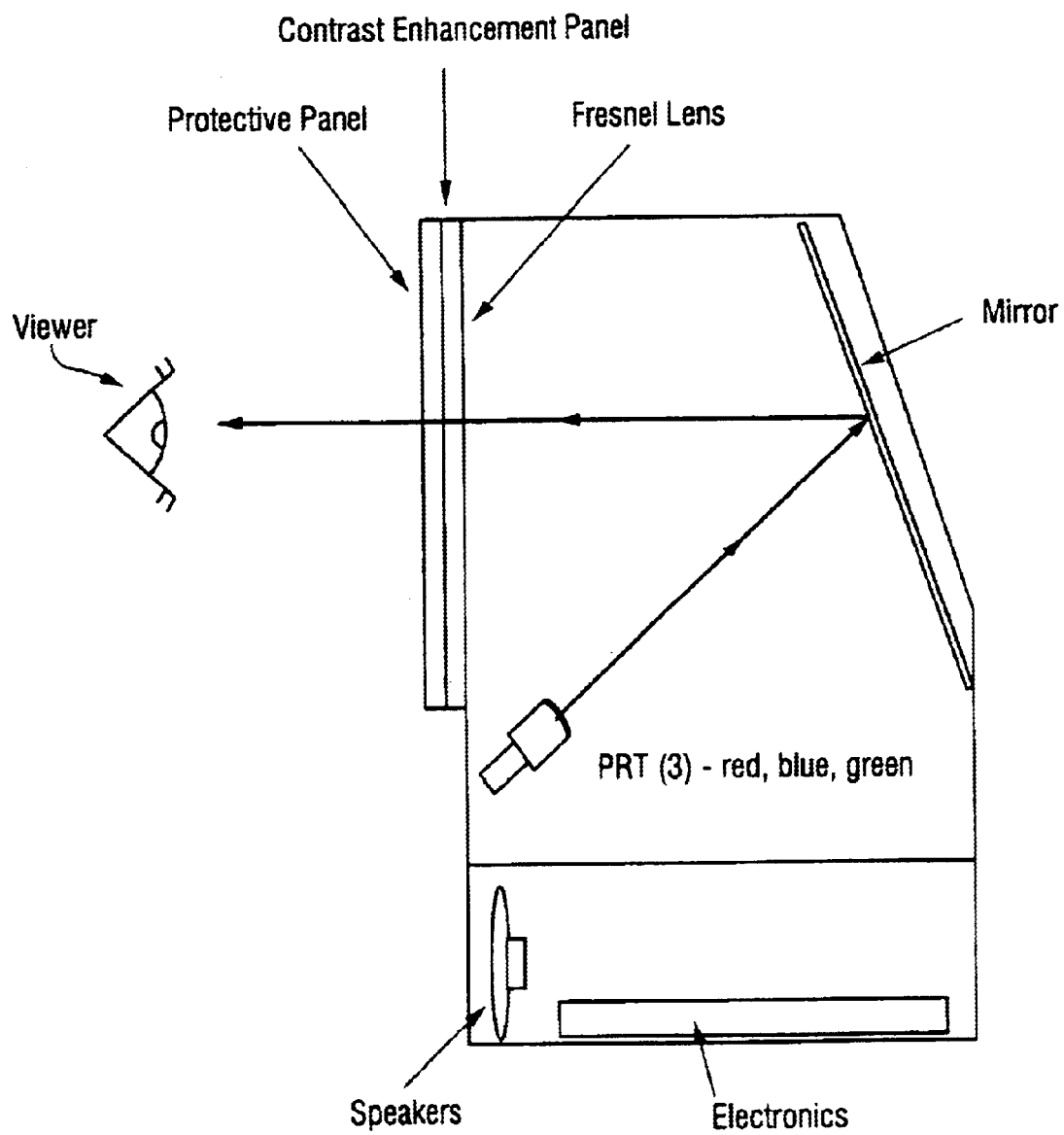
FIG. 2 is a schematic diagram of a projection television (PTV) using the mirror of FIG. 1 according to an example embodiment of this invention.

FIG. 2 is a schematic diagram illustrating the mirror of FIG. 1 being used in the context of a projection television (PTV). Light is directed toward and reflected by the mirror which in turn directs the light toward a Fresnel lens, contrast enhancement panel, and/or protective panel after which it ultimately proceeds to a viewer. The improved features of the mirrors discussed herein enable an improved PTV to be provided.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, the coatings discussed herein may in some instances be used in back surface mirror applications, different materials may be used, additional or fewer layers may be provided, and/or the like.

What is claimed is:

1. A projection television including a first surface mirror for reflecting at least red, green and blue light components from a source toward a lens of the television so that an image can be viewed by a viewer, the first surface mirror comprising:

a substrate supporting a coating, wherein the coating includes at least a reflective layer, first and second dielectric layers, and a layer comprising amorphous diamond-like carbon (DLC), wherein the reflective layer reflects at least said red, green and blue light components from said source toward said lens of said television so that an image can be viewed by a viewer of said television, wherein the reflective layer is provided between the substrate and the dielectric layers, and the layer comprising DLC is provided over the reflective layer and the dielectric layers.

wherein the first dielectric layer has an index of refraction value "n" greater than an index of refraction value "n" of the reflective layer and less than an index of refraction value "n" of the second dielectric layer, and the layer comprising DLC has an index of refraction value "n" no greater than the index of refraction value "n" of the second dielectric layer, and wherein the layer comprising DLC has an average density of at least about 2.4 gm/cm$^3$ and at least about 40% of carbon-carbon bonds in the layer comprising DLC are sp$^3$ type carbon- carbon bonds, and wherein the layer comprising DLC has an average hardness of at least about 10 GPa.

2. The projection television of claim 1, wherein the layer comprising DLC has an average density of at least about 2.7 gm/cm$^3$.

3. The projection television of claim 1, wherein the layer comprising DLC is from about 1–100 nm thick.

4. The projection television of claim 1, wherein the layer comprising DLC is from about 1–25 nm thick.

5. The projection television of claim 1, wherein the layer comprising DLC is from about 1–10 nm thick.

6. The projection television of claim 1, wherein the layer comprising DLC is from about 1–5 nm thick.

7. The projection television of claim 1, wherein the reflective layer is metallic and comprises at least one of Al and Ag.

8. The projection television of claim 7, wherein the reflective layer has a visible transmission of no greater than 1.5%.

9. The projection television of claim 1, wherein the first dielectric layer is provided between the reflective layer and the second dielectric layer, and wherein the first dielectric layer has an index of refraction value "n" of from 1.3 to 1.9, the second dielectric layer has an index of refraction value "n" of from 2.0 to 3.0, and wherein the substrate comprises glass.

10. The projection television of claim 1, wherein the first dielectric layer has an index of refraction value "n" of from 1.4 to 1.75, the second dielectric layer has an index of refraction value "n" of from 2.2 to 2.7, and the layer comprising DLC has an index of refraction value "n" of from 1.9 to 2.1.

11. The projection television of claim 1, wherein the first dielectric layer comprises silicon oxide, and wherein the substrate comprises glass.

12. The projection television of claim 1, wherein the second dielectric layer comprises titanium oxide.

13. The projection television of claim 1, wherein the first dielectric layer is from 70–110 nm thick, the second dielectric layer is from 20–60 nm thick, and the layer comprising DLC is from 1–25 nm thick.

14. The projection television of claim 1, wherein the mirror reflects at least 80% of incoming visible light, and carbon-carbon atoms and/or bonds of the layer comprising DLC are subimplanted into the second dielectric layer.

15. A mirror for use in a projection television for reflecting at least red, green, and blue light components from a source toward a lens of the television so that an image can be viewed by a viewer, the mirror comprising:

a substrate supporting a coating, wherein the coating includes a reflective layer for reflecting light toward the lens of the television, at least a first dielectric layer, and a layer comprising diamond-like carbon (DLC) provided over the reflective layer and the first dielectric layer, and wherein the layer comprising DLC has an average density of at least about 2.4 gm/cm$^3$ and at least about 40% of carbon-carbon bonds in the layer comprising DLC are sp$^3$ type carbon-carbon bonds, and wherein the layer comprising DLC is from about 1–100 nm thick.

16. The mirror of claim 15, wherein the layer comprising DLC has an average density of at least about 2.7 gm/cm$^3$.

17. The mirror of claim 15, wherein the layer comprising DLC is from about 1–10 nm thick.

18. The mirror of claim 15, wherein the reflective layer comprises at least one of Al and Ag, and wherein another dielectric layer is provided on the substrate over the first dielectric layer but under the layer comprising DLC.

19. The mirror of claim 15, wherein the reflective layer has a visible transmission of from 0.5 to 1.5%.

20. The mirror of claim 15, wherein the first dielectric layer is provided between the reflective layer and a second dielectric layer, and wherein the first dielectric layer has an index of refraction value "n" of from 1.3 to 1.9, the second dielectric layer has an index of refraction value "n" of from 2.0 to 3.0, the layer comprising DLC has an index of refraction value "n" less than that of the second dielectric layer, and wherein the layer comprising DLC is hydrogenated.

21. The mirror of claim 15, wherein the first dielectric layer has an index of refraction value "n" of from 1.4 to 1.75, provided over the first dielectric layer and under the layer comprising DLC has an index of refraction value "n" of from 2.2 to 2.7.

22. The mirror of claim 15, wherein the dielectric layer comprises at least one of silicon oxide and titanium oxide.

23. The mirror of claim 15, wherein the substrate comprises glass, the first dielectric layer is from 70–110 nm thick, a second dielectric layer is from 20–60 nm thick, and the layer comprising DLC is from 1–10 nm thick.

24. The mirror of claim 15, wherein the layer comprising DLC is hydrogenated.

25. The mirror of claim 15, wherein the layer comprising DLC comprises from 0.5 to 20% hydrogen.

26. The mirror of claim 15, wherein the layer comprising DLC is ion beam deposited on the substrate over the dielectric layer and over the reflective layer in a manner so that at least some carbon-carbon atoms and/or bonds of the layer comprising DLC are subimplanted into the dielectric layer.

27. A projection television including a first surface mirror for reflecting at least red, blue and green light components from a source toward a lens so that an image can be viewed by a viewer, wherein the first surface mirror comprises:

a glass substrate supporting a coating, wherein the coating includes a reflective layer for reflecting at least the red, blue and green light components from the source toward the lens so that the image can be viewed on the projection television, at least one dielectric layer, and a layer comprising amorphous diamond-like carbon (DLC), wherein the reflective layer is provided between the glass substrate and the dielectric layer, and the layer comprising DLC is provided over the reflective layer and the dielectric layer, and wherein the layer comprising DLC has an average density of at least about 2.4 gm/cm$^3$, an average hardness of at least about 10 GPa, and a thickness of from 1–100 nm.

28. The projection television of claim 27, wherein the layer comprising DLC has a thickness of from 1–10 nm, an average hardness of at least about 20 GPa, and an average density of from 2.6 to 3.1 gm/cm$^3$.

29. The projection television of claim 27, wherein carbon-carbon atoms of the layer comprising DLC are subimplanted into the dielectric layer.

30. The projection television of claim 27, wherein the dielectric layer has an index of refraction value "n" greater than that of the reflective layer and less than that of the layer comprising DLC.

* * * * *